United States Patent Office 3,432,458
Patented Mar. 11, 1969

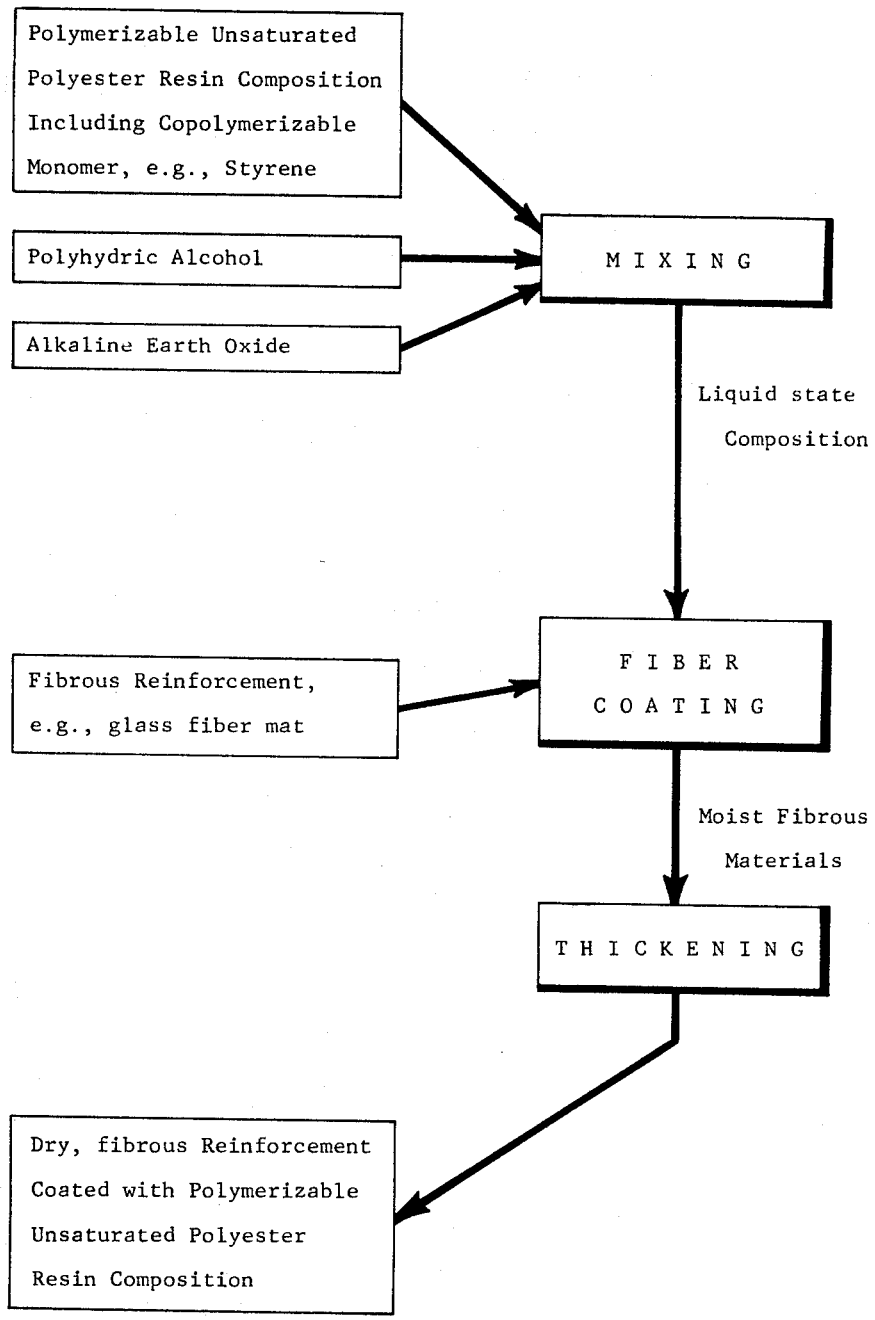

3,432,458
THICKENED POLYMERIZABLE UNSATURATED POLYESTER RESIN COMPOSITIONS AND FIBROUS SUBSTANCES IMPREGNATED THEREWITH
Fred K. C. Kwan, Chicago, Ill., and Richard C. Ross, Port Washington, and Glenn R. Svoboda, Grafton, Wis., assignors to Freeman Chemical Corporation, Port Washington, Wis., a corporation of Delaware
Filed Oct. 23, 1967, Ser. No. 677,246
U.S. Cl. 260—33.4
Int. Cl. C08f 21/02, 45/34, 45/10

7 Claims

ABSTRACT OF THE DISCLOSURE

A thickened polymerizable unsaturated polyester resin composition which is essentially dry to the touch at room temperature and which will flow upon heating prior to curing. The polyester resin is thickened by addition of both (a) an alkaline earth oxide such as MgO and CaO and (b) a polyhydric alcohol selected from the class consisting of diethylene glycol, dipropylene glycol, ethylene glycol, propylene glycol and glycerine. The thickened composition is used by applying it to fibrous reinforcing materials such as glass fiber rovings, fabrics, and randomly oriented glass fiber mats.

BACKGROUND OF THE INVENTION

Field of the invention

This invention relates to polymerizable resinous compositions in which fibrous reinforcing substances such as glass fibers are impregnated with polymerizable resinous compositions to produce a dried, hardened, impregnated fibrous composition which can be heated and will flow prior to curing. The compositions are curable to produce thermoset plastic substances.

Description of the prior art

Glass fiber reinforced polyester resin products are well known in the art. They comprise chopped glass fibers, woven glass fiber fabrics and randomly oriented glass fiber mats as reinforcement for a cured thermoset mass of unsaturated polyester resin. Customarily the polyester resin is applied as a liquid spray or dip to the fibrous reinforcing material immediately prior to the curing of the resin. See 3,243,949; 2,927,623. It is however known to apply a liquid state unsaturated polyester resin composition to fibrous reinforcing materials and to thicken the liquid polyester resin without causing significant gelation and curing thereof. See, for example, U.S. Patent 2,628,209 wherein a small quantity of magnesium oxide is included with the unsaturated polyester resin composition to cause it to become thickened without significant gelation when applied as an impregnant for the fibrous reinforcing substances.

The thickened resin is essentially dry to the touch and the impregnated fibers can be transported conveniently for subsequent use in the preparation of thermoset reinforced plastic articles.

Calcium oxide has been described as incapable of thickening unsaturated polyester resins. See U.S. Patent 2,628,209 supra. Calcium oxide is described elsewhere as accelerating the conjoint polymerization of unsaturated polyesters and styrene. See U.S. Patent 2,568,331. For the purposes of the present application, it is essential that the resinous composition be merely thickened without significant accompanying polymerization.

Summary of the invention

Unsaturated polyester resin compositions are blended with from 0.5 to 4.0 parts by weight (based on 100 parts of the resin) of a polyhydric alcohol selected from the class consisting of ethylene glycol, propylene glycol, diethylene glycol, dipropylene glycol and glycerine. That mixture is blended with 0.5 to 10.0 parts by weight of an alkaline earth oxide which can be calcium oxide or magnesium oxide. The resulting mixture remains fluid for a sufficiently long period of time to permit impregnation of fibrous reinforcing materials and thereafter, without curing, becomes thickened and substantially dry to the touch, yet remains polymerizable. The described polyhydric alcohol achieves thickening of the unsaturated polyester resin composition with calcium oxide—heretofore considered to be inoperable as a thickening agent. The inclusion of the described polyhydric alcohol hastens the heretofore known thickening which is achieved with a specified amount of magnesium oxide or, alternatively, allows the heretofore known thickening to be accomplished with a smaller amount of magnesium oxide that can be accomplished without the polyhydric alcohol.

Brief description of the drawings

The single drawing is a schematic flow diagram illustrating the present invention.

Description of the preferred embodiment

An unsaturated polyester resin composition can be prepared by polyesterification of a dihydric alcohol such as ethylene glycol, propylene glycol, diethylene glycol, dipropylene glycol, polyethylene glycol, polypropylene glycol, butylene glycol, neopentyl glycol and the like with a dicarboxylic acid or dicarboxylic acid anhydride wherein at least a portion of the dicarboxylic acid or anhydride includes alpha-beta-ethylenic unsaturation. Typical dicarboxylic materials include phthalic acid, isophthalic acid, phthalic anhydride, terephthalic acid, fumaric acid, maleic acid, maleic anhydride, tetrachlorophthalic acid and anhydride, itaconic acid, citraconic acid and the like. A copolymerizable monomer having terminal $>C=CH_2$ grouping, is included with the polyester, e.g., styrene, chloro-styrene, methyl styrene, acrylic acid, methacrylic acid, alkyl acrylates and methacrylates, divinyl benzene, diallyl phthalate, and the like. The unsaturated polyester resin compositions customarily contain an inhibitor of vinyl polymerization such as hydroquinone, toluhydroquinone, tert-butyl catechol for example. The composition also contains a quantity, preferably from about 0.5 to 2.0 percent by weight, of a high temperature curing catalyst for the resin. The catalyst is one which will not initiate the polymerization at the liquid-state temperatures at which the composition is applied to the fibrous materials. The catalyst also is preferably one whose decomposition is not induced by metal-ions. The unsaturated polyester resin composition also may contain thixotropic agents such as aerated silica aerogel. The proportion and use of unsaturated polyester resin compositions is well known, e.g., Polyesters and their Applications, Bjorksten et al., Reinhold, 1960. Examples of preferred catalysts are dicumyl peroxide, tert-butyl peroxide and tert-butyl perbenzoate.

An unsaturated polyester resin also may be prepared by the polyesterification of a polyepoxide such as diglycidyl ether of Bisphenol-A with acrylic or methacrylic acid. Such products include plural ester linkages and plural alpha-beta ethylenic unsaturation and are essentially free of unreacted epoxy groups. These polyesters are described, for example, in British patents 1,006,587 and 1,030,760.

Free polyhydric alcohol

The unsaturated polyester resin composition is combined with 0.5 to 4.0 percent by weight and preferably about 2% by weight of polyhydric alcohol selected from the class consisting of ethylene glycol, propylene glycol, diethylene glycol, dipropylene glycol and glycerine. Thereafter the mixture is combined with 0.5 to 10.0 parts by weight of alkaline earth oxide which can be calcium oxide or magnesium oxide. The alkaline earth oxide may be partially hydrolyzed to include a minor quantity of the alkaline earth hydroxide. However, excess hydroxyl content prevents the desired thickening from occurring.

Example I

An unsaturated polyester resin was prepared from 1.09 mols propylene glycol, 0.60 mols phthalic anhydride, 0.40 mols maleic anhydride. The reactants were heated in a reaction kettle for several hours until a low acid number indicated substantially complete reaction. The unreacted propylene glycol was stripped from the system and the resin was cut back with 29 parts by weight styrene. As a polymerization inhibitor, 0.01 weight percent hydroquinone was added.

The polyester resin had an initial viscosity of 2500 centipoises.

Five parts by weight of calcium oxide was added to 100 parts by weight of the resin and the viscosity of the mixture was measured over a period of 4 days as set forth in the following table:

Table I—Viscosity of resin, Example I

| Time, hours: | Viscosity, poises |
| --- | --- |
| 0 | 40.50 |
| 2 | 38.00 |
| 3 | 38.00 |
| 24 | 50.00 |
| 48 | — |
| 96 | 37.00 |

Thus it appears that the described unsaturated polyester resin is unaffected by the addition of calcium oxide. The viscosity of the composition at the end of four days is approximately the same as it was at the outset of the test.

The same polyester resin composition I was combined with 1% by weight propylene glycol, 2% by weight propylene glycol, 5% by weight propylene glycol. A filled unsaturated polyester resin Composition II was prepared by combining the resin Composition I with 30 percent by weight of ASP 400 which is a silica gel thixotropic additive. Resin Composition II was mixed with 1% by weight propylene glycol, 2% by weight propylene glycol and 5% by weight of calcium oxide was added and the viscosity was measured through 24 hours. The viscosity values are set forth in the following table.

TABLE II.—VISCOSITY OF COMPOSITIONS OF UNSATURATED POLYESTER AND 5% BY WEIGHT CALCIUM OXIDE, POISES

| Time, hours | Free propylene glycol content | | | | | |
| --- | --- | --- | --- | --- | --- | --- |
| | Clear resin I | | | Filled resin II | | |
| | 1% | 2% | 5% | 1% | 2% | 5% |
| 0 | 20.5 | 21.8 | 19.2 | 51 | 54.5 | 56.5 |
| 2 | 33 | 220 | 123 | 114 | 300 | 370 |
| 3 | 45 | 340 | 130 | 1,000 | 1,000 | 440 |
| 24 | 1,000 | 1,000 | 240 | | | 1,000 |

From the foregoing table it can be seen that the combination of propylene glycol and 5% by weight calcium oxide increases the viscosity of the unsaturated polyester resin composition above 1000 poises (except in the instance of the 5% resin dilution where a substantial increase in viscosity was nonetheless observed).

In all instances the thickened polyester resin compositions could be heated and caused to flow without concurrent gelation and hardening. By the addition of substantial heat, the resinous compositions could be cured to a hardened thermoset condition.

In an effort to show the unique character of the selected polyhydric alcohols for the present purposes, a series of comparative tests was conducted with the following polyhydric materials: isopropyl alcohol, propylene glycol, dipropylene glycol, polypropylene glycol-425, ethylene glycol, diethylene glycol, polyethylene glycol-600, glycerine, trimethylolpropane, pentaerythritol and sorbitol. Note: Polypropylene glycol-425 is a mixture of polypropylene glycols having an average molecular weight of 425. Similarly polyethylene glycol-600 is a mixture of polyethylene glycols having an average molecular weight of 600. In each instance the described unsaturated polyester resin Composition I was combined with 5% by weight calcium oxide and 2% by weight of the polyhydric alcohol. The viscosity of the composition was measured at the end of 2 hours and at the end of 24 hours. The viscosities of the mixtures are set forth in the following table.

TABLE III.—VISCOSITIES OF UNSATURATED POLYESTER RESIN COMPOSITIONS

| Polyhydric additive | Initial | After— | |
| --- | --- | --- | --- |
| | | 2 hours | 24 hours |
| Isopropyl alcohol | 14 | 14 | 21 |
| Propylene glycol | 19.5 | 20 | 1,000 |
| Dipropylene glycol | 15.2 | 24 | 1,000 |
| Polypropylene glycol-425 | 16 | 25 | 36 |
| Ethylene glycol | 20 | 45 | 1,000 |
| Diethylene glycol | 20 | 1,000 | |
| Polyethylene glycol-600 | 20 | 20 | 36 |
| Glycerine | 22.5 | 1,000 | |
| Trimethylol propane | 13.4 | 23 | 80 |
| Pentaerythritol | 14.0 | 25 | 29 |
| Sorbitol | 13 | 28 | 35 |
| No additive | 19 | 22 | 29 |

From inspection of the foregoing table it will be seen that the propylene glycol, dipropylene glycol, ethylene glycol, diethylene glycol and glycerine uniquely achieve the desired viscosity increase in the unsaturated polyester resin composition in combination with calcium oxide.

Similar thickening can be achieved with magnesium oxide in place of the calcium oxide when the polyhydric alcohol is included in accordance with this invention. The thickening achieved with magnesium oxide is brought about in less time or is achieved with less magnesium oxide than the thickening which is obtained with magnesium alone in accordance with the prior art, i.e., U.S. Patent 2,628,209.

Glass fiber roving comprising multi-strand glass fibers, can be impregnated with the present unsaturated polyester resin compositions while they are in their relatively fluid state. Thereafter the roving can be coiled or spooled and the resin composition allowed to thicken. A preferred embodiment of the present invention involves the impregnation of a spooled mat of randomly oriented glass fibers of the general type described in U.S. Patent 3,276,928. The impregnated mat, while still relatively moist, is recoiled with a barrier membrane such as cellophane or polyethylene sheeting between the wraps of the spool. The polyester resin thickens and hardens without gelation when the present compositions are employed as the impregnant. Woven glass fiber fabrics also are useful as the reinforcing material which is coated with the thickened polymerizable compositions.

The accompanying drawing illustrates schematically the starting materials and the processing steps of the preferred embodiment of the invention. The liquid state composition which is applied as a coating to the fibrous materials contains all of the ingredients to keep the coated fibrous material intact for commercially feasible storage periods and to cause the resinous constituents to cure when heated above the liquid state coating temperature. The coated fibrous material is merely introduced into a heated mold whence it flows initially to fill the cavity and conform to the mold. Thereafter the resin polymerizes in the mold cavity and the desired thermoset product is produced.

Reinforced unsaturated polyester resin laminates may contain from about 10 to about 60 percent resin and the balance glass reinforcement. Usually the resin content is about 25 to 50 percent with the glass reinforcement comprising the remaining 75 to 50 percent. Accordingly the amount of the resinous composition applied to the fibrous reinforcement should be from about 0.1 to about 1.5 times the fiber weight, and preferably from about 0.33 to 1.0 times the fiber weight.

The preferred unsaturated polyester resins contain about 45 to 90 parts by weight of the polymerizable polyester and from about 55 to 10 parts by weight of copolymerizable monomer.

We claim:

1. A thickened polymerizable resinous composition, essentialy dry to the touch and capable of flowing without curing upon heating, said resinous composition including:
   (A) 100 parts by weight of polymerizable polyester resin comprising from 10 to 55 parts by weight of a copolymerizable monomer containing a terminal $>C=CH_2$ group and 90 to 45 parts by weight of an unsaturated polyester selected from the class consisting of:
       (a) the polyesterification reaction product of polyhydric alcohol and dicarboxylic material selected from the class consisting of dicarboxylic acids and dicarboxylic acid anhydrides, at least a portion of said dicarboxylic material comprising ethylenically unsaturated dicarboxylic acid or acid anhydride; and
       (b) the polyesterification reaction product of a polyepoxide and ethylenically unsaturated monocarboxylic acid;
   (B) from 0.5 to 4.0 parts by weight of polyhydric alcohol selected from the class consisting of ethylene glycol, propylene glycol, diethylene glycol, dipropylene glycol and glycerine;
   (C) from 0.5 to 10.0 parts by weight of alkaline earth oxide selected from the class consisting of calcium oxide and magnesium oxide.

2. A fibrous reinforcement, dry-to-the-touch, including fibrous reinforcing components which are coated with an unpolymerized polymerizable resinous composition of claim 1.

3. The fibrous reinforcement of claim 2 wherein the fibrous reinforcing components are randomly oriented glass fibers.

4. The fibrous reinforcement of claim 2 wherein the fibrous reinforcing components are woven glass fiber fabrics.

5. A coiled fibrous reinforcement mat, dry-to-the-touch, comprising a randomly oriented glass fiber mat, coated with the resinous composition of claim 1.

6. The method of preparing a dry-to-the-touch fibrous reinforcement impregnated with sufficient unpolymerized polymerizable unsaturated polyester resinous composition of claim 1 which comprises
   heating the said resinous composition to a liquid state
   impregnating the fibrous mat with the liquid state resinous composition; and
   cooling the impregnated fibrous mat to thicken the said resinous composition in a dry-to-the-touch, still unpolymerized, polymerizable condition.

7. A glass fiber roving comprising multi-strand glass fibers coated with the dry-to-the-touch resinous composition of claim 1.

References Cited

UNITED STATES PATENTS

| | | | |
|---|---|---|---|
| 2,628,209 | 2/1953 | Fisk | 260—861 X |
| 3,131,148 | 4/1964 | Taulli | 260—40 X |
| 3,338,850 | 8/1967 | Sbarra et al. | 260—40 X |

MORRIS LIEBMAN, *Primary Examiner.*

L. T. JACOBS, *Assistant Examiner.*

U.S. Cl. XR

260—40, 861, 863